United States Patent [19]

Lange

[11] 4,281,602

[45] Aug. 4, 1981

[54] MOLDED OBJECTS SUCH AS TABLES, CHAIRS AND THE LIKE

[75] Inventor: Gerd Lange, Kapsweyer, Fed. Rep. of Germany

[73] Assignee: Gebruder Thonet AG, Frankenberg, Fed. Rep. of Germany

[21] Appl. No.: 920,201

[22] Filed: Jun. 29, 1978

[30] Foreign Application Priority Data

Dec. 12, 1977 [DE] Fed. Rep. of Germany ....... 2755336

[51] Int. Cl.$^3$ ........................ A47B 13/08; B29C 5/00; B25G 3/34

[52] U.S. Cl. ................................. 108/161; 156/242; 156/245; 264/DIG. 83; 297/DIG. 1; 297/DIG. 2; 403/265

[58] Field of Search ....... 264/263, 271, 261, DIG. 83, 264/46.4; 403/267, 265; 156/242, 245; 52/284, 309.14, 309.13, 309.4, 309.1; 297/DIG. 1, DIG. 2; 108/161

[56] References Cited

U.S. PATENT DOCUMENTS

| | | | |
|---|---|---|---|
| 2,392,734 | 1/1946 | Haberstump | 403/265 X |
| 3,259,435 | 7/1966 | Jordan, Jr. | 297/DIG. 2 |
| 3,274,160 | 9/1966 | Ellegast et al. | |
| 3,687,092 | 8/1972 | Manning | 297/DIG. 2 |
| 3,784,254 | 1/1974 | Logato | 297/DIG. 2 |
| 3,931,772 | 1/1976 | Puccio | 108/161 |
| 3,970,732 | 7/1976 | Slaats et al. | 264/DIG. 83 |
| 4,038,359 | 7/1977 | Pendleton | 264/263 |
| 4,049,368 | 9/1977 | Grachten | 264/261 X |
| 4,144,296 | 3/1979 | Dickens | 264/261 |

FOREIGN PATENT DOCUMENTS

| | | | |
|---|---|---|---|
| 2109068 | 9/1971 | Fed. Rep. of Germany | 264/DIG. 83 |
| 2246913 | 4/1974 | Fed. Rep. of Germany | |
| 1029444 | 6/1953 | France | 403/265 |
| 2337024 | 7/1977 | France | 264/263 |
| 1305224 | 1/1973 | United Kingdom | 264/DIG. 83 |

*Primary Examiner*—James T. McCall
*Attorney, Agent, or Firm*—Browdy and Neimark

[57] ABSTRACT

An article of manufacture, such shelves, tables, stools and chairs. The article has a cold molded edge formed by combining a panel with support frame fitted thereagainst into a mold and then adding plastic to cast the panel and frame together to a desired shape with a cold molded edge.

7 Claims, 8 Drawing Figures

MOLDED OBJECTS SUCH AS TABLES, CHAIRS AND THE LIKE

The invention relates to a method of manufacturing molded objects, especially shelves, tables, stools, and chairs, by molding cold-curable molding materials to a semifinished product, as well as objects molded in this fashion, with a cold-molded edge.

It is known to provide objects for daily use, especially tables, with an edge which is "cold-molded" by a special method.

BACKGROUND OF THE INVENTION

The term "cold molding" is understood by an individual skilled in the art to be a method of joining by molding cold-curing materials with in situ polymerization to a semifinished product. In contrast to the known injection molding method, no significant pressure is exerted during molding in the cold-molding method, and no significant external heat is applied, so that the molding material cures by a chemical reaction in a cold state.

To mold table top edges of sufficient quality, it is necessary according to the art to dry the table top, which is usually made of wood or chip board, intensively to keep the moisture in the wood low so as to avoid a chemical reaction during molding as well as warping of the top, so that no harmful jamming takes place between the table top and the edge when only the unbeveled edge is molded. To produce a permanent connection between the table top and the edge, it is also necessary according to the state of the art to mold around the entire circumference of the table top in the case of smooth table top edges which are beveled. In this case, the surfaces in contact must be extremely clean and free of grease, so that the relatively small edge area of a table top can be utilized completely to produce a bond by providing a sufficiently large contact area. To increase the contact area and to provide a decorative covering, it is also known to add an additional strip of chip board around the edge of a chip board table top, so that the support frame of the table top is not visible to an observer when the molded object is used. The edge of the table top and the edge of the chip board strip are integrally cold-molded to produce a seamless and visually attractive border. However, the application of an additional chip board strip is comparatively costly and increases the cost of manufacturing molded objects for daily use, which are usually mass-produced articles in which particular emphasis is placed upon low manufacturing cost.

SUMMARY OF THE INVENTION

An object of the invention is to provide a method of manufacturing molded objects of the type described hereinabove, especially shelves, tables, stools, and chairs, as well as the provision of an object of this kind with a cold-molded edge, wherein a permanent and visually attractive edge is made possible and provided in an especially simple and economical fashion.

This object according to the invention is achieved by a method of manufacturing molded objects by molding cold-curing materials to a semifinished product, characterized by the fact that the semifinished product is a panel with a support frame fitted tightly to the bottom, said frame being cast in a mold together with the smooth edge to produce a desired shape and thickness.

According to the invention, there is no need to add additional material to the edge of the panel in order to provide a covering for the support frame. The support frame itself is molded to a desired shape, so that it is integral with the edge of the panel. The edge of the panel can be made narrow and unbeveled, without significantly influencing the firm connection between the molded profile and the panel. The molded profile can easily be changed to a specific shape and style by using a different mold, whereby the semifinished product, panel, and support frame can be kept unchanged in many cases. Consequently, the method according to the invention permits simple and economical adaptation to changes in style. The fact that the support frame is covered by molding material also reduces the danger of accidents without any additional cost. By covering the support frame, usually made of welded metal, the latter does not require aftertreatment or surface treatment, thus eliminating another work step in manufacture. By molding the support frame to a desired shape and thickness, a desired visual effect is produced in a simple manner as far as the thickness of the panel which can be seen is concerned.

An advantageous method is characterized by the fact that the support frame is aligned with the panel before molding then molded to the panel without being attached thereto. In this manner, the connection between the support frame and the panel is provided exclusively by the molding material. The connection between the frame and the panel, usually provided by the state of the art, for example in the form of screws, can thus be eliminated.

An advantageous improvement of the invention provides that the support frame, provided with sockets for interchangeable legs, is cast in one piece. The flow of molding material from the edge of the panel to the leg further increases optimal accident prevention.

According to another preferred method, the support frame mounted on the edge of the panel and projecting over the edge of the panel can be cast in a mold.

Molding is performed in particular in an angular mold with a separable closing mold which closes around the support frame and sockets (if any) during molding. This provides an additional contact area for the molding material on the underside of the panel, behind the support frame, which provides an even stronger connection between the individual parts.

Molding is performed advantageously with a dispensing gun, said gun being suspended from the ceiling especially during molding and guided along the molded seam. This provides for simple and at least semiautomatic molding.

According to a method according to the invention, shelves, tables, stools, or the like can be made with a border molded on the panel or seat, wherein the support frame is mounted to fit closely against the panel and sockets are provided for legs or supports, whereby both the support frame and the edge of the panel as well as the sockets (if any) are molded using a cold-moldable material to produce a desired shape.

The support frame can be made of hollow profiles.

In particular, the support frame can project around the circumference of the panel without molding. This ensures a shoulder between the edge of the panel and the support frame which is advantageous during molding and ensures better holding together of the individual parts.

An advantageous improvement of the invention provides that the sockets for interchangeable legs or supports are made in different shapes and sizes. In particular, wood, metal, and plastic in a wide variety of profiles, for example oval, triangular, or quarter-circular can be used as the materials for the legs or supports. In addition, the length of the legs can be adapted for a special application of the object intended for daily use according to the invention.

Another embodiment of the invention provides that the support frame is fastened to the panel only by the molded profile.

The molded profile can be in particular a two-component material based on polyurethane. It is well known, as indicated in U.S. Pat. No. 3,274,160, to prepare polyurethane castings from a two-component material, in particular a prepolymer which is then cross-linked with polyhydric alcohol, the prepolymer being formed by reacting an excess of organic polyisocyanate with a polyhydroxyl compound.

Finally, an improvement according to the invention as partially shown in FIGS. 2 and 4 is characterized by the fact that the panel and the support frame are made of different materials. Metal, wood, and plastic can be used as the material of the panel and support frame. The connection according to the invention with the aid of the molded profile makes it possible to have a free selection of materials for the individual parts without the holding-together of the individual parts after molding being impaired thereby.

BRIEF DESCRIPTION OF THE DRAWINGS

The invention is described hereinbelow with respect to embodiments and with reference to the attached drawing in greater detail.

BRIEF DESCRIPTION OF THE PREFERRED EMBODIMENTS

In the perspective view of a table 1 according to the invention, table top 2 is shown with table top edge 3 to be molded as well as support frame 4 in an exploded view. Any suitable material may be used as the table top material. The surface of the table top can be coated, for example, with laminated material, such as Resopal or Formica. In addition, wood veneer or metal coatings may be used, and can merge continuously with the edge profile after molding as described hereinbelow.

Figure 1:
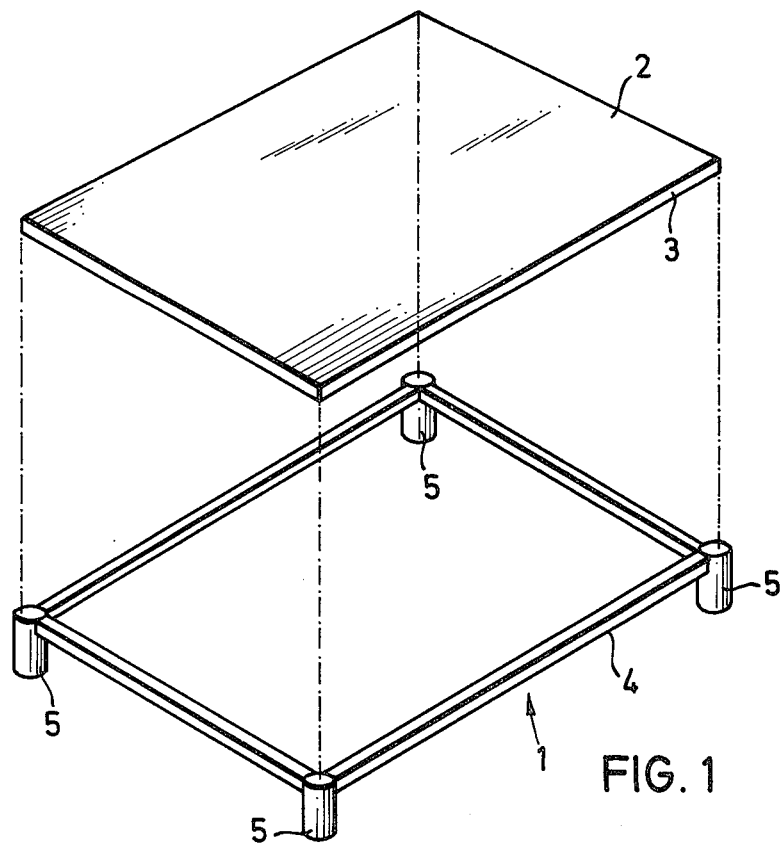
FIG. 1 is a table constructed according to the invention before molding, in an exploded perspective view.

Support frame 4 according to FIG. 1 is made rectangular and provided at each corner with sockets 5 to accept interchangeable legs or supports 6.

Figure 2:
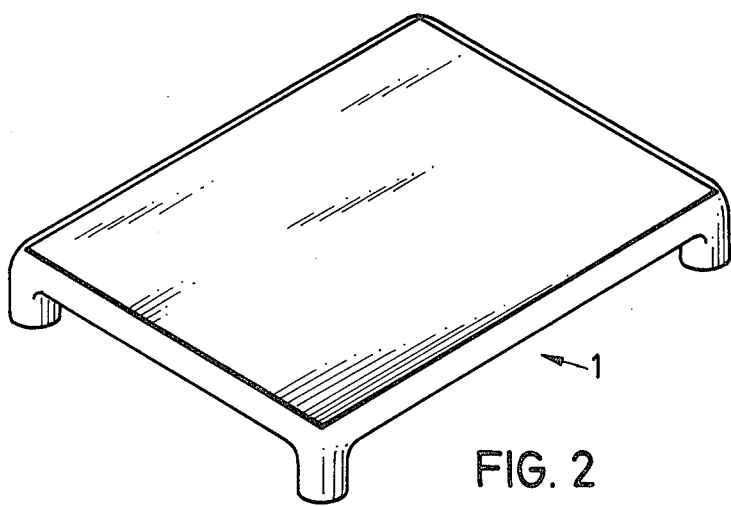
FIG. 2 is a perspective view of a table according to FIG. 1 after molding, whereby the legs have not been inserted.

FIG. 2 shows the molded and assembled semifinished product, consisting essentially of table top 2 and support frame 4. The feet or supports 6 are not shown as having been inserted in sockets 5.

Figure 3:
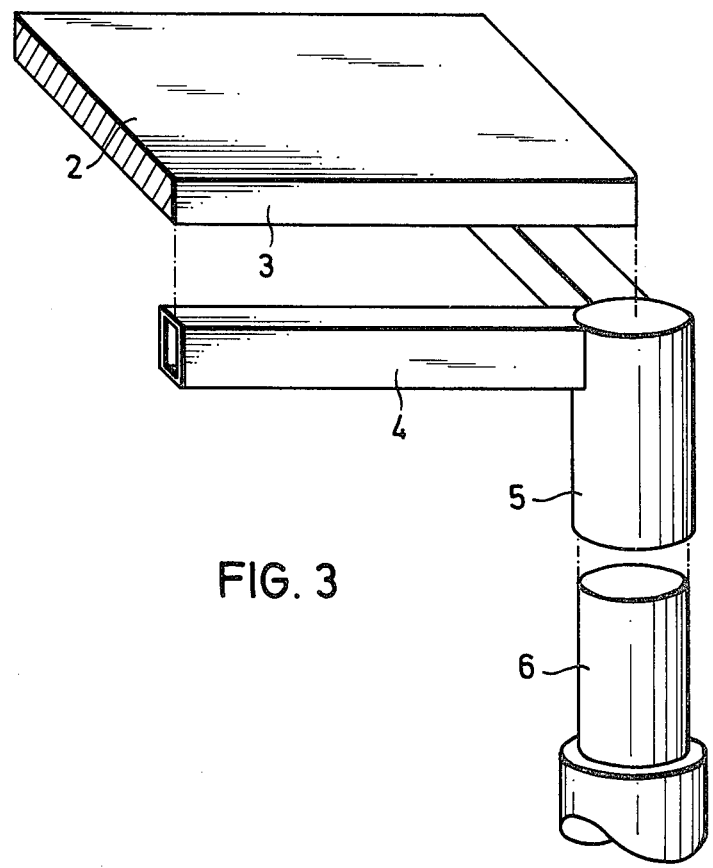
FIG. 3 is a perspective view of a detail of one corner of the table in an exploded form before molding.
Figure 4:
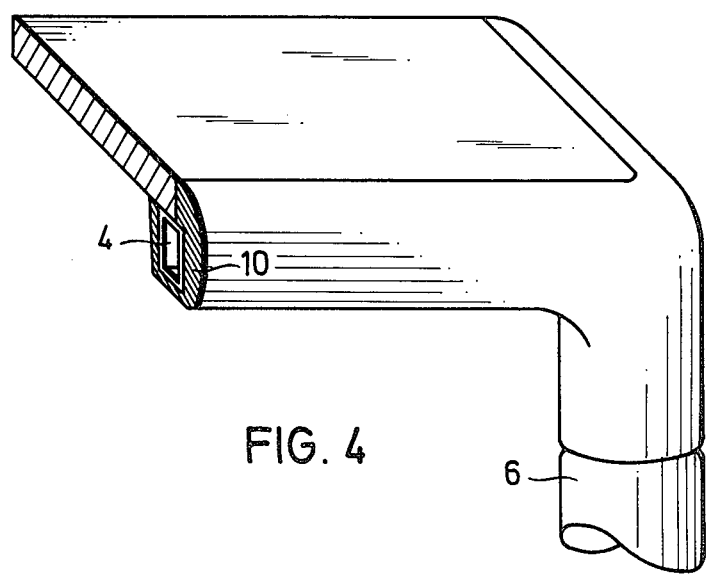
FIG. 4 shows a detail according to FIG. 3 after molding.
Figure 5:
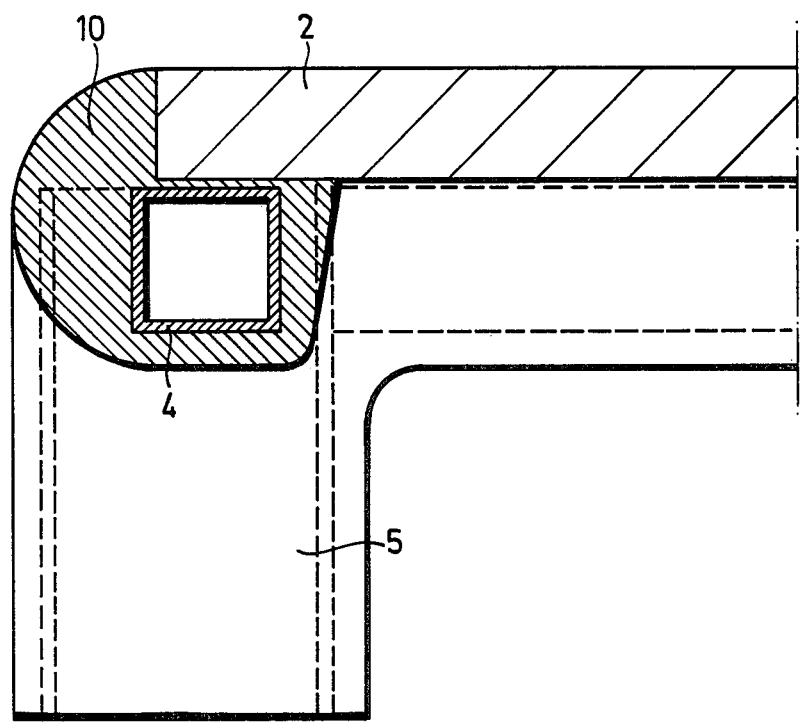
FIG. 5 is a vertical cross section through a table top constructed according to the invention according to FIGS. 1 to 4.

The design of the table is most clearly evident from FIGS. 3 to 5. In the assembled state, table top 2 fits closely against metal support frame 4 made of hollow profiles, whereby the support frame projects beyond table top edge 3 around the circumference. Support frame 4 and table top 2 are not fastened directly together. They are connected together exclusively by molded material 10, whereby the molded profile covers the edge of the table top 3, support frame 4 including sockets 5, and a strip on the edge of the table top, which runs around the circumference on the under side of the table top behind support frame 4. Molded profile 10 produces a completely enclosed organic form of table top edge, which shows no metal supporting elements whatever, and wooden or metal legs of different lengths can be inserted in sockets 5. The complete casting of support frame 4 in a desired shape and thickness determines in particular the thickness of the table top, which is visible to an observer when the table is used. Consequently, the table top does not require an additional strip around the edge of the table top to make the table appear more solid, as is conventional according to the state of the art.

Figure 6:
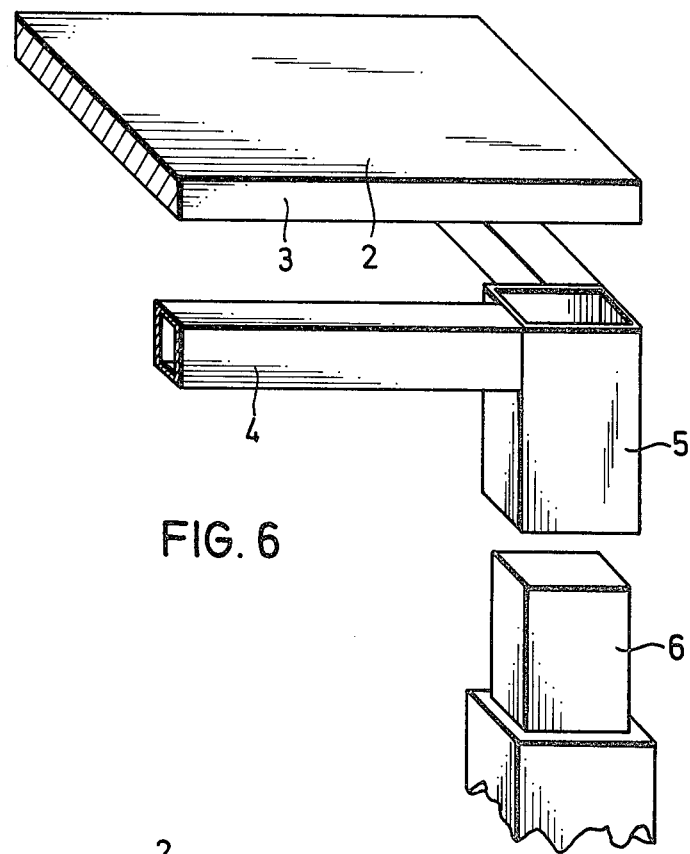
FIG. 6 is a perspective view according to FIG. 3 of another embodiment of the invention.
Figure 7:
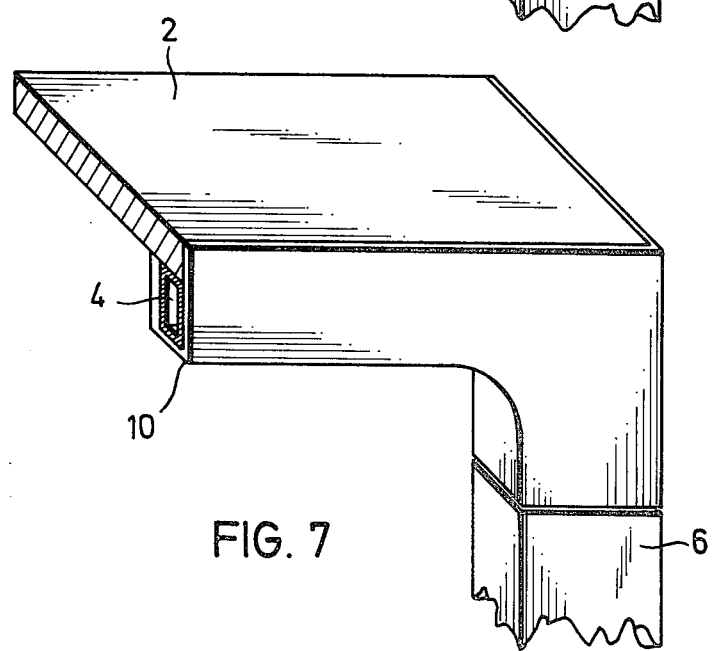
FIG. 7 is a view corresponding to FIG. 4 of the corner of the table according to FIG. 6 after molding, whereby polygonal table legs are provided.
Figure 8:
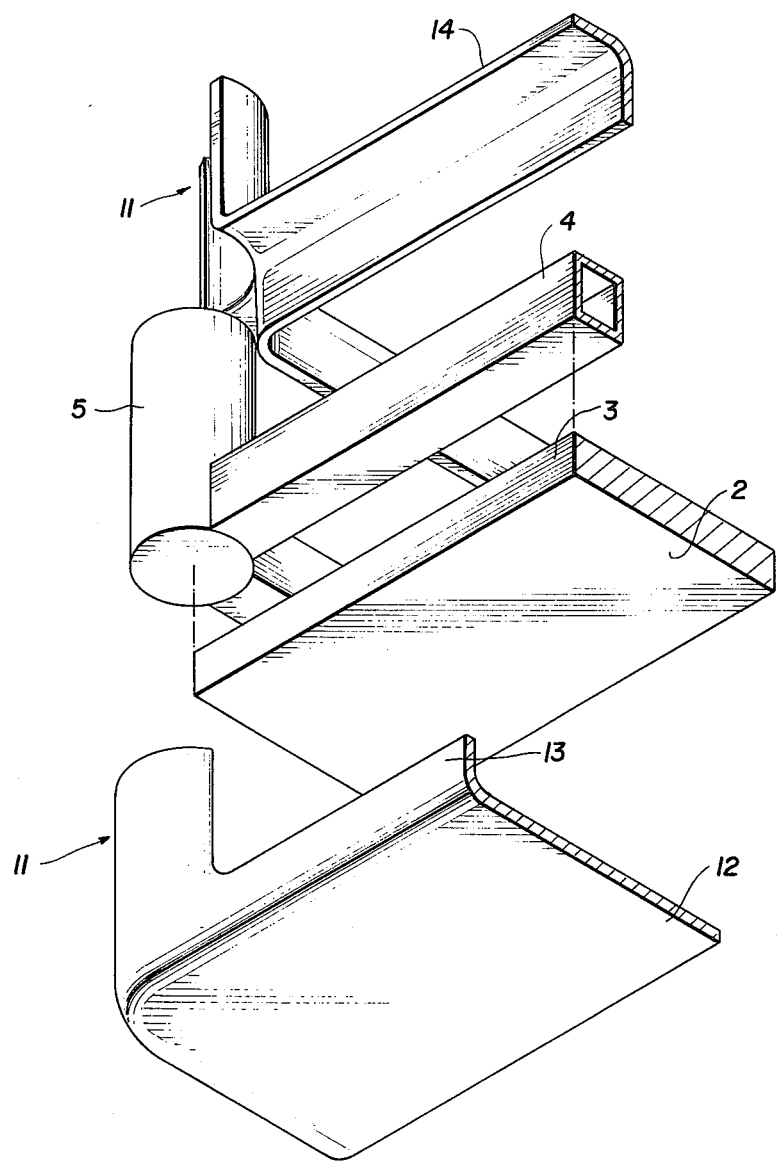
FIG. 8 is an exploded view of a mold for constructing the table top shown in FIGS. 2 and 4.

The detail shown in FIGS. 6 and 7 corresponds to that in FIGS. 3 and 4 and shows another embodiment of a table constructed according to the invention, whereby the molded edge of table top 2 and support frame 4 is made polygonal, including sockets 5. For aesthetic reasons, a type of leg is used in this embodiment of a table which is likewise made polygonal in cross section.

To construct a table built according to the invention as partially shown in FIGS. 2 and 4, a table top 2 is placed in a first element of an angular mold 11 with the edge of the panel to which the molding is to be applied resting in spaced relationship from the walls 13 of the first element 12 of the mold. The under side of panel 2, which fits tightly against the surface resting against the angular mold, becomes the upper surface of the table top of the finished product. Then support frame 4 is fitted tightly against table top 2 with sockets 5 directed upward, whereby support frame 4 is aligned with table top 2 and a circumferential space to be filled with molding material is left between support frame 4 and the side walls 13 of the first element 12 of the angular mold. The mold is then closed by a closing element 14 of the mold, which fits around the outer circumference of the angular mold and against an inner circumference of the upper surface of the panel. The support frame 4 as well as sockets 5 are thus enclosed in the mold. Cold-curing material is then injected into the mold 11 with the aid of a dispensing gun through appropriate conventional injection channels or gutters along the circumference of the mold 11, so that the hollow space formed by the semifinished product and the mold is filled completely by molding material. The two-component molding material cures in the cold state. After curing, the mold 11 is opened and the table top, with a molded profile 10 around it, can be removed from the mold. Appropriate legs 6 are inserted in sockets 5 for ultimate use of the table.

It is intended that the method according to the invention be used for simple mass production of tables, as well as shelves, chairs, stools, or the like. In many cases, in order to provide a different design for the outer edge of such flat objects, it is sufficient to insert identically formed semifinished products in differently shaped molds.

I claim:

1. A molded article suitable for use as a table top or seat for a chair or stool, and the like comprising a support frame and a panel, said support frame being positioned adjacent to and fitting against said panel and having downwardly extending sockets which are to receive ends of legs, said support frame and panel being joined by a plastic material molded about at least edges of said panel and support frame to provide a desired shape and fix said support frame to said panel, said plastic material being polymerized in situ with no significant pressure being exerted and no significant external heat being applied during molding, said plastic material being cured in situ by chemical reaction.

2. An article according to claim 1, wherein said support frame has a hollow profile.

3. An article according to claim 1, wherein said support frame is larger in lateral extent than said panel so that it projects beyond said panel along its periphery.

4. An article according to claim 1, wherein said support frame is provided with sockets designed for receiving interchangeable legs of different shapes and sizes.

5. An object according to claim 1, wherein the plastic material is a polyurethane two-component material.

6. An article according to claim 1, wherein said panel and support frame are made of different materials.

7. An article according to claim 1, including leg members positioned in each of said sockets, the article and said leg members forming a table.

* * * * *